United States Patent [19]
Sacks

[11] 3,966,634
[45] June 29, 1976

[54] GASIFICATION METHOD

[75] Inventor: Martin E. Sacks, East Windsor, N.J.

[73] Assignee: Cogas Development Company, Princeton, N.J.

[22] Filed: Sept. 23, 1974

[21] Appl. No.: 508,394

[52] U.S. Cl. .............................. 252/373; 48/197 R; 48/202
[51] Int. Cl.² ........................ C07C 1/02; C10J 3/12
[58] Field of Search ........... 48/202, 197 R; 252/373; 208/8

[56] References Cited
UNITED STATES PATENTS

| | | | |
|---|---|---|---|
| 2,714,059 | 7/1955 | Bearer | 48/197 R |
| 3,375,175 | 3/1968 | Eddinger et al. | 201/31 |
| 3,505,204 | 4/1970 | Hoffman | 48/202 X |
| 3,540,867 | 11/1970 | Baron et al. | 48/197 R |
| 3,725,270 | 4/1973 | Tassoney et al. | 252/373 X |
| 3,752,771 | 8/1973 | Dille et al. | 252/373 |
| 3,759,837 | 9/1973 | Dille et al. | 252/373 |
| 3,850,839 | 11/1974 | Seglin et al. | 252/373 |

Primary Examiner—Joseph Scovronek

[57] ABSTRACT

Coal gasification process gives a waste water stream containing phenolic impurities. This stream is fed into contact with hot solid heat transfer particles to form superheated steam which is fed to the gasification zone.

1 Claim, 4 Drawing Figures

GASIFICATION METHOD

This invention relates to a process in which coal is pyrolyzed and reacted with steam to produce mainly carbon monoxide and hydrogen. As is well known the main gasification reaction is one between carbon and steam.

$$C + H_2O \rightarrow CO + H_2$$

This reaction is endothermic. Heat can be supplied indirectly by a heat transfer medium or directly by the addition of oxygen to the gasifier, or by gasifying at high pressures where the exothermic reaction between carbon and hydrogen is thermodynamically favored.

$$C + 2H_2 \rightarrow CH_4$$

In one preferred process the coal is pyrolyzed to form a char which is then fed to the gasification zone. In other processes raw coal is fed to the gasification zone and pyrolysis also occurs in that zone. Pyrolysis reactions release tars, oils, tar acids and bases, water, hydrogen sulfide, organic sulfides, ammonia and organic nitrogen compounds. During gasification of a char, oxygen, nitrogen and sulfur compounds in the coal can react to form water, ammonia and hydrogen sulfide. Thus the gaseous streams taken from the gasification zone and from any preliminary pyrolysis zones contain water, including unreacted steam from the gasification zone. Condensation of this water, in the course of purifying the gaseous streams, results in the formation of highly contaminated waste water containing particulate matter, dissolved carbon dioxide, hydrogen sulfide and ammonia, and, depending on the particular process, dissolved organics (tar acids and bases) and traces of oil. Disposal of this waste water through ordinary channels can create serious environmental problems.

In some processes, the resulting purified gaseous mixture of carbon monoxide and hydrogen may then be converted into methane (commonly referred to as substitute natural gas, "SNG"). This may be done by through shift and methanation reactions:

$$CO + H_2O \rightarrow H_2 + CO_2$$

$$CO + 3H_2 \rightarrow CH_4 + H_2O$$

In accordance with one aspect of this invention there is provided a process which takes contaminated waste water and converts it to superheated steam containing impurities (e.g. carbon dioxide, hydrogen sulfide and ammonia) and this superheated steam is fed to the gasification zone. More particularly, the contaminated waste water is fed to a pebble heater which is supplied with preheated pebbles. The waste water is distributed onto these pebbles, as by spraying, and as a result it vaporizes and is superheated.

Figure 1:
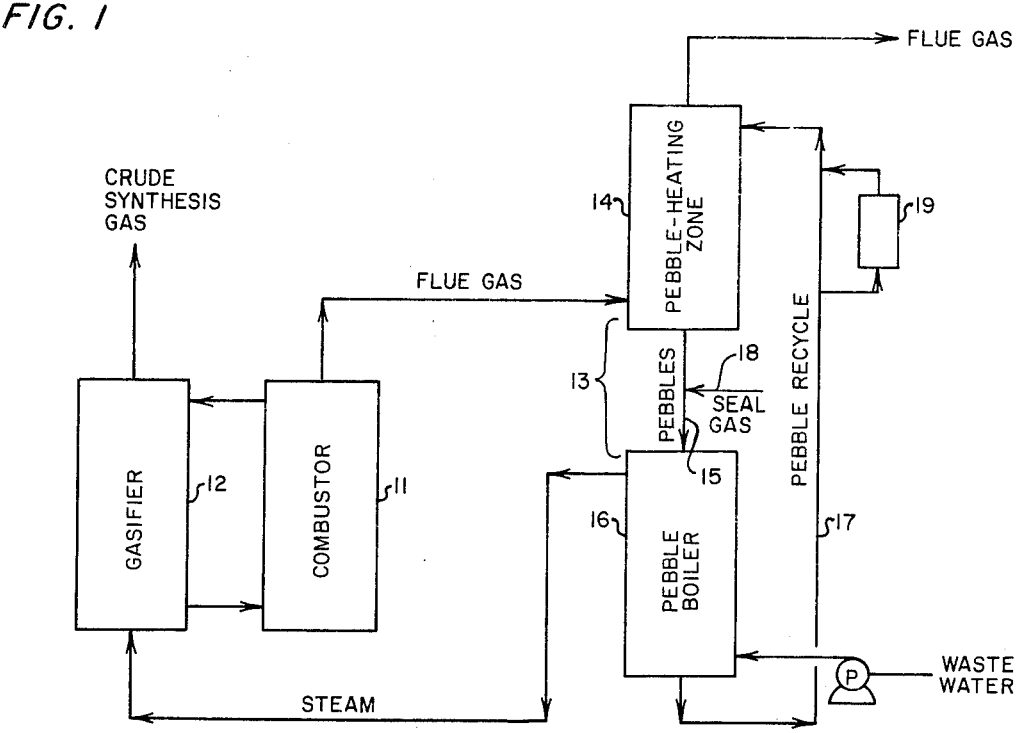
FIG. 1 is a flow sheet drawing of the invention.

The gasification reaction generally is effected at a temperature of about 750° to 1100°C preferably about 850° to 1000°C at pressures from atmospheric up to about 1000 psig or more. In one preferred process the pressure is about 50 to 100 psig. In other known gasification processes considerably higher pressures are used, e.g. about 300–400 psig (such as about 350 psig) in one case and about 1000 psig in another case. The heat for the endothermic gasification reaction may be supplied by a heat carrier material, such as solid heat-transfer particles which are heated by the combustion of fuel in a combustion zone 11 (FIG. 1). The resulting hot particles are circulated to the gasification zone 12 and then back to the combustion zone 11, the zones 11 and 12 being maintained at about the same pressure.

For the heat transfer medium circulated in the combustion zone and gasification zone one one may employ, for instance, materials known in the art such as inert refractory pebbles e.g. of alumina or mullite, agglomerated ash from the burning of coal, calcined dolomite which undergoes an exothermic reaction with $CO_2$ in the gasification zone, char, coke, etc. The gasification zone preferably comprises a fluidized bed of the char or other carbonaceous material into which the steam is fed. The arrangement of gasification and combustion zones is, as previously indicated, preferably such that these zones are maintained at substantially the same pressure, so that little if any of the gas made in the gasifier tends to flow into the combustor and vice versa. For instance the pressure differences between these zones may be about 5 psi or less. Part of the heat for the endothermic gasification reaction can be supplied by the superheat of the steam fed thereto.

In one embodiment of the invention the flue gas from the combustion zone 11 is fed to a pebble heater, indicated generally as 13. The hot flue gas passes through a first pebble zone 14 where it serves to preheat the pebbles, and then leaves. The resulting preheated pebbles pass to a second pebble zone 16 to which the contaminated waste water is fed. The resulting steam is supplied to the gasification zone 12 and the pebbles are returned to the first pebble zone 14, all the zones 11, 12, 14, 16 being maintained at a pressure which is approximately the same throughout said zones. The pebbles may be returned by means of a conveyor 17 (which may be a mechanical or pneumatic lift which is insulated so as to conserve the heat in the pebbles).

Pebble heaters and the pebbles used therein are well known in the art. See, for instance Findley and Goins, Advances in Petroleum Chemistry and Refining 2, (published by Interscience, 1959) chapter 3, p. 127–206 entitled "Pebble Heaters". See also the articles by C. L. Norton Jr. in Chemical & Metallurgical Engineering, July 1946, p. 116–119 and M. O. Kilpatrick et al in Petroleum Refiner, April 1954, p. 171–174. In the practice of this invention the zone in which the pebbles are heated (e.g. zone 14 of FIG. 1) and the one in which the waste water is vaporized (e.g. zone 16) are at substantially the same pressure so that little if any of the heating gas mixes with the steam and vice versa. For instance, the pressure differences between these zones may be about 2 to 5 psi. In one embodiment the bottom of zone 14 is at a pressure of say about 54 psig and the top of zone 16 is at a pressure of about 52 psig, the two zones being connected by a pebble-filled tube 15 into which is injected a small stream 18 of a seal gas (preferably steam) at a higher pressure than that in the bottom of zone 14 to prevent, or diminish, the transfer of flue gas from zone 14 into the steam generated in zone 16. The hot flue gas fed from the combustion zone to the pebble heater is usually at a temperature in the range of about 900° to 1100°C and the difference between that gas temperature and the temperature to which the steam is heated in the pebble heater is, say, about 100° to 200°C. The pebbles are preferably spherical balls of heatresistant inert material such as alumina, mullite or stainless steel, having a diameter of, say, on the order of 1 cm.

It is also within the broader scope of the invention to employ the pebble heater for treating the waste water to produce steam for the gasifier in processes in which the heat for gasification is supplied autothermally within the gasification reactor. In that case, instead of feeding flue gas, made in the combustion zone, to the pebble heater one feeds the synthesis gas (i.e. the gas produced in the reactor). Typically the temperature of this gas is about 850° to 1000°C and the difference between that gas temperature and the temperature to which the steam is heated in the pebble heater is, say, about 100° to 200°C.

In a less desirable embodiment of the invention there is a separate heat supply for the pebble heater which produces steam from the waste water. That is, fuel and oxygen (usually air) (instead of flue gas or synthesis gas) are supplied to the first pebble zone 14. In this case the pebbles can be heated there to a higher temperature, such as about 1000° to 1650°C preferably about 1000° to 1400°C, to give steam in the second pebble zone 16 at a temperature at, say, about 800° to 1200°C, the pressure in the first pebble zone being about the same as that in the second pebble zone which is in turn at a slightly higher pressure than that in the gasification zone (e.g. the pressure differential is sufficient to cause the steam to flow to the gasification zone through the unobstructed pipes leading thereto from the second pebble zone).

Figure 3:
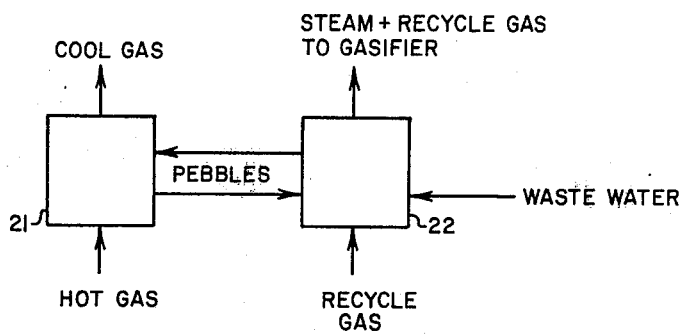
FIG. 3 shows a preferred embodiment of the invention.

Instead of using a pebble heater, in which the pebbles are maintained in contact with each other in the pebble-heating and steam-generating vessels, one may employ, less desirably, a fluidized bed of heat-transfer particles (pebbles) of fluidizable size, as in the embodiment shown in FIG. 3. Thus the pebble-heating zone 21 is supplied with hot gas (e.g. flue gas or make gas, as previously discussed) which passes upwardly and serves to fluidize the pebbles, the heated pebbles from zone 21 are transferred to zone 22 where they are fluidized by a gas which is compatible with the gasification reaction such as steam, carbon monoxide, hydrogen or carbon dioxide or a mixture of two or more of these gases which are substantially free of inert gas such as nitrogen. Waste water is injected into zone 22 and steam generated therefrom (mixed with said fluidizing gas, when the latter is not steam) is taken from the upper part of zone 22 and fed to the gasification zone. The cooler pebbles from zone 22 are transferred back to zone 21 for reheating. Since the amount of waste water is usually insufficient to generate all the steam needed in the gasification reaction the required fresh steam may be conveniently employed as the fluidizing medium. Preferably the fluidizing gas is substantially free of nitrogen which (passing to the gasification zone) would undesirably dilute the make-gas.

Figure 4:
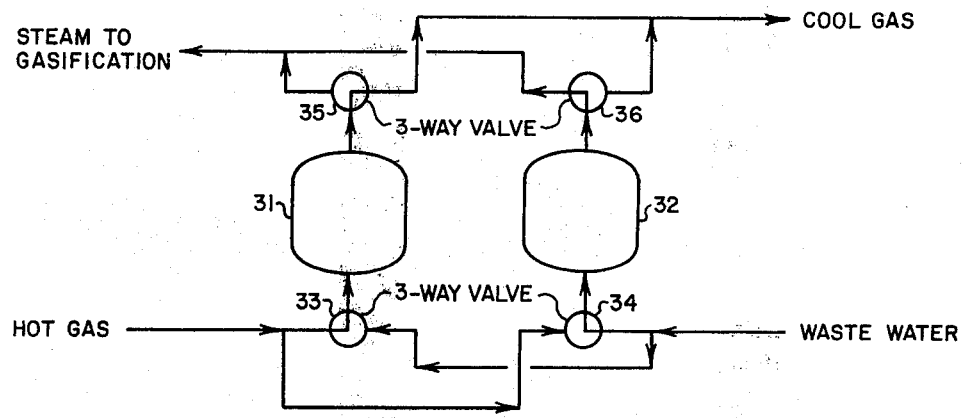
FIG. 4 shows another preferred embodiment of the invention.

In another embodiment, illustrated in FIG. 4, the pebbles are not circulated but are present as essentially stationary beds 31, 32 in a multi-zone recuperative stove. The hot gas is fed to one zone to heat the pebbles therein while waste water is fed to the second zone, which contains previously heated pebbles. Then, the three-way valves 33, 34, 35, 36 are reset so that the hot gas flows to the now-cooler second zone and the waste water is injected into the now hotter first zone, this alternation being repeated continually.

In the pebble heaters, hydrogen sulfide dissolved in the waste water is vaporized, passed to the gasification zone and appears in the synthesis gas together with additional hydrogen sulfide formed in the gasification reaction. Carbon dioxide in the vaporized waste water reacts with char in the gasification zone to form CO. The acid gas constituents are then removed in the gas purification section. The ammonia dissolved in the waste water is also vaporized in the pebble heater (or decomposes therein if the temperature is above about 550°C) and decomposes to form hydrogen and nitrogen in the gasification zone; the hydrogen enriches the resulting gas while the nitrogen acts as a diluent in the gas stream. The proportion of ammonia in the vaporized waste water and the proportion of waste water are generally such that the added nitrogen contributed by the decomposition of said ammonia is well below 1% (preferably less than ½%) of the final product gas stream. Other constituents in the waste water, such as trace tar and dissolved or dispersed organics, are decomposed, at least in part, during vaporization in the pebble heater, decomposition being completed in the gasification zone. Inorganic non-volatile constituents such as particulate matter or salts in the waste water may form liquid or solid deposits on the pebbles, e.g. a molten salt phase on the surfaces of the pebbles leaving the steamproducing zone. To keep these deposits from building up a slip stream of the pebbles (e.g. a minor proportion, such as 5% of the main pebble stream) may be withdrawn from the main pebble stream, either continuously or intermittently, and treated to remove the deposits, as by passing through a cooler abrading zone (e.g. zone 19 in FIG. 1) such as a rotating drum in which the pebbles rub against each other at a temperature at which the deposit is solid, e.g. about 300°C.

In one preferred process, shown in the drawing, vapors resulting from low temperature pyrolysis at 39 may be led to a separation zone 41 in which they are cooled to condense oily liquids and water and the aqueous phase is separated from the oily phase. This aqueous phase is typically, say, about 4 to 12% by weight of the coal fed to the pyrolysis zone and contains fairly high concentrations of watermiscible organic compounds (such as phenol, cresols, xylenols, resorcinol, methyl dihydroxybenzene), hydrogen sulfide (e.g. in amount in the range of about 0.1 to 1%, such as about 0.3 to 0.5%) and ammonia (e.g. in amount in the range of about 0.1 to 0.5%, such as about 0.2 to 0.4%), together with water-dispersed higher alkylated phenols, such as a broad spectrum of mixed phenols of the type having two or more carbons in one or more substituents (which substituents maybe cyclic) and/or three or more methyl substituents, the individual components of this mixture being present in such small proportion as to be dispersed or dissolved in the water. Thus, such compounds as ethyl phenol, propyl phenol, hydroxyindane, dihydroxy ethyl methyl indene, dihydroxyl naphthalene, trimethyl phenol tetramethyl phenol and dimethyl ethyl phenol may be present, among others.

In the process illustrated in the drawing, the oily liquids are then purified at 42 to remove heteroatoms and reduce their viscosity. One method for doing this involves hydrogenation which converts combined nitrogen, oxygen and sulfur to ammonia, water and hydrogen sulfide, respectively, and yields to two phase mixture comprising an aqueous phase and an organic phase, the latter being a combustible light hydrocarbon oil, which may be further refined or treated to produce typical petroleum products such as gasoline, etc. Processes of this type are known in the art, as in "hydrocracking" (such as described in The Oil and Gas Journal April 25, 1966 pages 146-14 167). The separated aqueous liquor contains water-miscible or water-dispersed organic compounds, such as phenols (e.g. in amount up to about 3%), organic bases (e.g. in amount up to about 1%), hydrogen sulfide (e.g. in amount in the range of about 0.1 to 1%, such as about 0.3 to 0.5%) and ammonia (e.g. in amount in the range of about 0.1 to 0.5%, such as about 0.2 to 0.4%).

The pyrolysis of the coal by low temperature carbonization, e.g. at a final char temperature up to about 700°C, is described in chapter 10 (by Wilson and Clendenin entitled "Low-Temperature Carbonization") of Chemistry of Coal Utilization by H. Y. Lowry, Supplementary Volume published 1963 by Wiley, N.Y.

In one preferred process for carrying out the pyrolysis at 39, the coal is passed through a series of fluidized beds (not shown) at progressively higher temperatures to devolatilize the coal. The process involves partial oxidation of the material only in the very last stages of the process, after about all the condensable volatiles have been removed. Examples of such processes are found in Eddinger, Jones and Seglin Pat. No. 3,375,175 of Mar. 26, 1968, whose entire disclosure is incorporated herein by reference.

Figure 2:
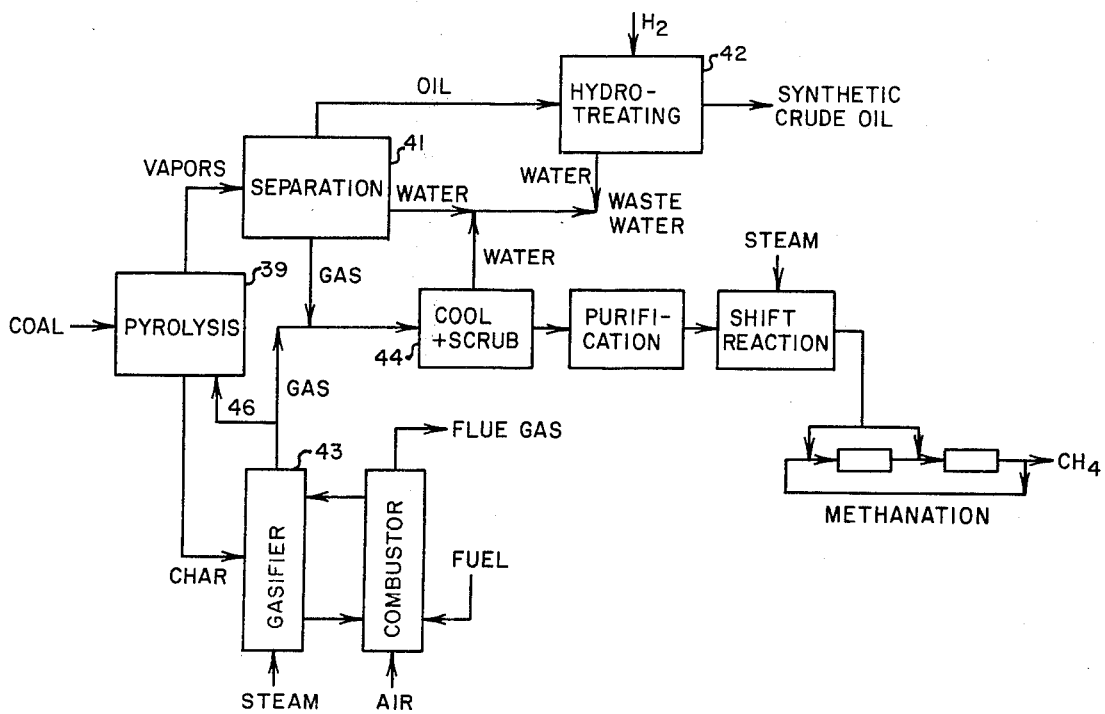
FIG. 2 is a flow sheet drawing of the invention in combination with a synthetic crude oil zone and a methanation zone.

The synthesis gas stream produced by the gasification (at 43) of the char contains not only carbon monoxide and hydrogen but unreacted steam, particulate material (such as char fines), $CO_2$, a little ammonia, hydrogen sulfide (e.g. up to about 1% depending on the sulfur content of the coal) and traces of phenolic materials. In the embodiment illustrated in FIG. 2 this gas stream is subjected at 44 to a purification step after it has been mixed with uncondensed material (gas) from the separation step applied to the volatilized products of the pyrolysis; the latter gas (from the separation step) may contain $C_1$–$C_4$ hydrocarbons, CO, $H_2$, $CO_2$, $H_2S$, $NH_3$, COS. The purification at 44 may be effected, for instance, by scrubbing and cooling the gas with plain water (e.g. to reduce the gas temperature to a temperature of about 25° to 200°C, preferably about 40°C, at a pressure of about 25 to 150 psig, preferably about 50 psig); this yields an aqueous waste stream containing dissolved hydrogen sulfide, carbon dioxide, ammonia and particulates and, often, water-soluble or water-dispersed organic compounds (such as phenolic compounds) and traces of water-insoluble oily material. After scrubbing and cooling, the gas still contains such impurities as $H_2S$ and it is preferably given a further treatment, e.g. a solvent extraction (using such solvents as potassium carbonate solution or alkanolamine solutions; see the processes described for instance in the series of articles entitled "Lease-Gas Sweetening" which appeared in The Oil and Gas Journal in 1967, August 14, 21 and October 9 and in 1968 Jan. 8, June 3 and 17). The gas may then be subjected to a shift reaction, desirably after reducing the sulfur content of the gas to a very low level as by contact with a suitable material such as zinc oxide.

As illustrated, in one preferred embodiment a portion 46 of the crude synthesis gas stream (e.g. about 15 to 30%, such as about 25%, thereof) from the gasification zone is fed to one or more of the pyrolysis zones 39 to serve as a fluidizing medium therein and its constituents will thus be incorporated with the pyrolysis products.

Also, instead of adding the relatively impure pyrolysis gas from separation zone 41 to the synthesis gas, the pyrolysis gas may be separately treated for removal of $H_2S$ (and $CO_2$), e.g. by solvent extraction as described above, and then washed, as with a liquid hydrocarbon, to remove $C_2$–$C_4$ hydrocarbons. The resulting purified pyrolysis gas may then be mixed with the purified synthesis gas and the resulting gas mixture may then be subjected to a shift reaction, desirably after reducing the sulfur content to a very low level as by contacting the gases, individually or in admixture, with a suitable material such as zinc oxide.

The shift reaction is caried out at a temperature of say about 250°to 550°C desirably at a relatively high pressure, such as 500 psig, in the presence of added steam to convert some of the carbon monoxide in the gas to carbon dioxide and hydrogen, e.g. to give a 1:3 CO:$H_2$ mol ratio. The gas may then be cooled to condense out some of the water content to adjust the water content prior to methanation.

The gas may then be subjected to methanation in which the carbon monoxide and hydrogen react in the presence of a suitable catalyst (such as the known nickel catalyst) to form methane and water. The gas is then cooled to condense out the water. Owing to the purity of the feed gas at this stage, the condensed water is relatively pure and suitable for use in a conventional steam boiler to make steam for the process. In addition the methanation reaction is very exothermic and may be used as a source of heat (by conventional heat-exchange) to produce steam for the process.

The methanation reaction is preferably carried out in stages, as is known in the art. Thus the feed gas stream may be divided into several smaller substreams. One substream is diluted with a stream of recycled methane and fed to a first methanation reactor. The hot gaseous product at a temperature of, say, about 500°C is then cooled, by heat-exchange, to a temperature of, say, about 300°C, and the second substream of feed gas is mixed therewith and fed to a second methanation reactor, and so forth.

For each 100 parts by weight of water fed to the gasifier, the amount of the waste water which is most highly contaminated with organic compounds, i.e. the aqueous pyrolysis liquor generated from the pyrolysis of the coal, generally is in the range of about 8 to 15 parts (e.g. about 11 parts). When a water-containing gas is used for fluidization in the pyrolysis step, (such as the gas stream 46 from the gasification zone) the amount of waste water from the pyrolysis step, e.g. the aqueous phase from separation zone 41, may be about doubled, e.g. it now amounts to about 15 to 20 parts per 100 parts of water fed to the gasifier. The amount of waste water from the purification of the crude gas (e.g. from purification 44) may be in the range of, say 20 to 30 parts; the total amount of waste water from these three steps (pyrolysis, hydrotreating, crude gas purification) is generally below 50 parts such as in the range of about 35 to 45 parts (again per 100 parts of water fed to the gasifier) and the amount of relatively pure water from the methanation step may be relatively large such as about 25 to 35 parts.

The pyrolysis liquor from low temperature carbonization contains a significant proportion of phenolic compounds which have a higher content of alkyl substituents and are much less biodegradable than the phenolic mixture (containing xylenols and cresols) produced by higher temperature carbonization.

In spraying the waste water onto the pebbles it is preferable to have the spray nozzle situated so as to inject the water into the lower portion of the mass of pebbles, e.g. at the bottom of the second pebble zone 16.

In FIG. 4 the multi-zone recuperative stove may contain brick or ceramic checkerwork instead of pebbles. Like the pebbles, this checkerwork is a solid heat-transfer material which is substantially inert in the process and which is preheated, before contact with the waste water, to a temperature of above 500°C preferably above 600°C such as about 800°C. or higher, e.g. 1000°C, or more, the solid heat-transfer material being repeatedly reheated after contact with the waste water and repeatedly recycled (after reheating) into contact with additional quantities of the waste water.

In this application all proportions are by weight unless otherwise indicated.

It is understood that the foregoing detailed description is given merely by way of illustration and that variations may be made therein without departing from the spirit of the invention.

I claim

1. In a system of synthesis gas manufacture including a gasifier wherein fluidized char is reacted with steam using a particulate heat exchange material to sustain the endothermic steam-carbon reaction to produce a synthesis gas stream which on cooling gives water contaminated with $H_2S$ and $NH_3$ and a carbonizer wherein fluidized coal is carbonized below about 700°C to provide said char and vapors which on cooling give oil and water contaminated with $H_2S$, $NH_3$ and organic materials, the improvement which comprises heating solid heat transfer material to a temperature above 500°C, then, after said heating, feeding a stream of said contaminated waters into contact with said preheated heat transfer solid to form superheated steam, feeding said superheated steam to said gasification zone, repeatedly reheating said solid after said contact with said contaminated waters and repeatedly recycling the reheated solid into such contact with additional quantities of said contaminated waters, said solid being substantially inert in said process.

* * * * *